United States Patent
Shih et al.

(10) Patent No.: US 10,162,454 B2
(45) Date of Patent: Dec. 25, 2018

(54) TOUCH DISPLAY APPARATUS AND OPERATION METHOD THEREOF

(71) Applicant: Acer Incorporated, New Taipei (TW)

(72) Inventors: Nai-Wen Shih, New Taipei (TW); Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 286 days.

(21) Appl. No.: 15/081,808

(22) Filed: Mar. 25, 2016

(65) Prior Publication Data

US 2017/0115801 A1     Apr. 27, 2017

(30) Foreign Application Priority Data

Oct. 21, 2015  (TW) ............................... 104134515 A (51) Int. Cl.
  *G06F 1/16*   (2006.01)
  *G06F 3/041*  (2006.01)
  *G06F 3/046*  (2006.01)

(52) U.S. Cl.
  CPC ........... *G06F 3/0416* (2013.01); *G06F 3/046* (2013.01); *G06F 3/0412* (2013.01); *G06F 1/1618* (2013.01); *G06F 2203/04102* (2013.01)

(58) Field of Classification Search
  CPC ........... G06F 2203/04102; G06F 3/041; G06F 3/0416; G06F 3/0412; G09G 5/00
  See application file for complete search history.

(56) References Cited

U.S. PATENT DOCUMENTS

| | | | |
|---|---|---|---|
| 2005/0140646 A1 | 6/2005 | Nozawa | |
| 2008/0291225 A1 | 11/2008 | Arneson | |
| 2013/0335366 A1* | 12/2013 | Lee | ......... G06F 3/044 |
| | | | 345/174 |
| 2014/0098040 A1* | 4/2014 | Kwon | ....... G06F 3/01 |
| | | | 345/173 |

FOREIGN PATENT DOCUMENTS

| | | |
|---|---|---|
| CN | 101674347 | 3/2010 |
| TW | 201033957 | 9/2010 |
| TW | 201415123 | 4/2014 |

* cited by examiner

*Primary Examiner* — William Boddie
*Assistant Examiner* — Alecia D. English
(74) *Attorney, Agent, or Firm* — J.C. Patents (57) ABSTRACT

A touch display apparatus and an operation method of the touch display apparatus are provided. The touch display apparatus includes a flexible touch display panel, a transmission electrode, and a reception electrode. The flexible touch display panel is bendable along a bending line. The transmission electrode and the reception electrode are arranged in the flexible touch display panel. The transmission electrode and the reception electrode are symmetrically located on two sides of the bending line, respectively, so that the reception electrode can receive a signal transmitted from the transmission electrode when the flexible touch display panel is bent along the bending line. The display mode of the flexible touch display panel is determined according to whether the reception electrode receives the signal transmitted from the transmission electrode.

26 Claims, 7 Drawing Sheets

TOUCH DISPLAY APPARATUS AND OPERATION METHOD THEREOF

CROSS-REFERENCE TO RELATED APPLICATION

This application claims the priority benefit of Taiwan application serial no. 104134515, filed on Oct. 21, 2015. The entirety of the above-mentioned patent application is hereby incorporated by reference herein and made a part of this specification.

FIELD OF INVENTION

The invention relates to a touch apparatus; more particularly, the invention relates to a touch display apparatus and an operation method thereof.

DESCRIPTION OF RELATED ART

Flexible display panels including organic light emitting display (OLED) panels have been applied in smart phones. Due to the advantages of slimness and light weight, capability of displaying colorful images, little power consumption, and flexibility, the OLED panels can be adapted to foldable smart phones. When the foldable mobile phones are being folded, different touch sub-regions of the flexible touch display panel approach each other. If the sub-regions are not temporarily prevented from performing the display and touch functions, the touch sub-regions of the flexible touch display panel interfere with each other, and thus the flexible touch display panel cannot enter into the hibernation mode.

SUMMARY OF THE INVENTION

The invention is directed to a touch display apparatus and an operation method thereof to sense whether a flexible touch display panel is being bent.

In an embodiment of the invention, a touch display apparatus that includes a flexible touch display panel, a first transmission electrode, and a first reception electrode is provided. The flexible touch display panel is configured to be bent along a first bending line. The first transmission electrode and the first reception electrode are arranged on the flexible touch display panel. Here, the first transmission electrode and the first reception electrode are symmetrically located on two sides of the first bending line, respectively, such that the first reception electrode can receive a signal transmitted from the first transmission electrode when the flexible touch display panel is bent along the first bending line. A display mode of the flexible touch display panel can be determined according to whether the first reception electrode receives the signal transmitted from the first transmission electrode.

In an embodiment of the invention, an operation method of a touch display apparatus includes: providing a flexible touch display panel configured to be bent along a first bending line; arranging a first transmission electrode on the flexible touch display panel; arranging a first reception electrode on the flexible touch display panel, wherein the first transmission electrode and the first reception electrode are symmetrically located on the two sides of the first bending line, respectively, such that the first reception electrode receives a signal transmitted from the first transmission electrode when the flexible touch display panel is bent along the first bending line; determining a display mode of the flexible touch display panel according to whether the first reception electrode receives the signal transmitted from the first transmission electrode.

In light of the above, it is possible to sense whether the flexible touch display panel of the touch display apparatus is bent through applying the operation method. The first transmission electrode and the first reception electrode are symmetrically located on the two sides of the bending line, respectively. When the flexible touch display panel is bent along the bending line, the first reception electrode can receive the signal transmitted from the first transmission electrode. Hence, the first transmission electrode and the first reception electrode can be configured to sense whether the flexible touch display panel is being bent. The display mode of the flexible touch display panel can be correspondingly changed according to whether the first reception electrode receives the signal transmitted from the first transmission electrode.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

The word "couple" (or connect) in the description and claims may refer to any direct or indirect connection. For instance, in the description and claims, if a first device is coupled to (or connected to) a second device, it means that the first device may be directly connected to the second device or may be indirectly connected to the second device through another device or by another connection means. Moreover, elements/components/steps with same reference numbers represent the same or similar parts in the drawings and embodiments. The descriptions of the same elements/components/steps in an embodiment of the invention may be applied to the descriptions of the same elements/components/steps in another embodiment.

Figure 1:
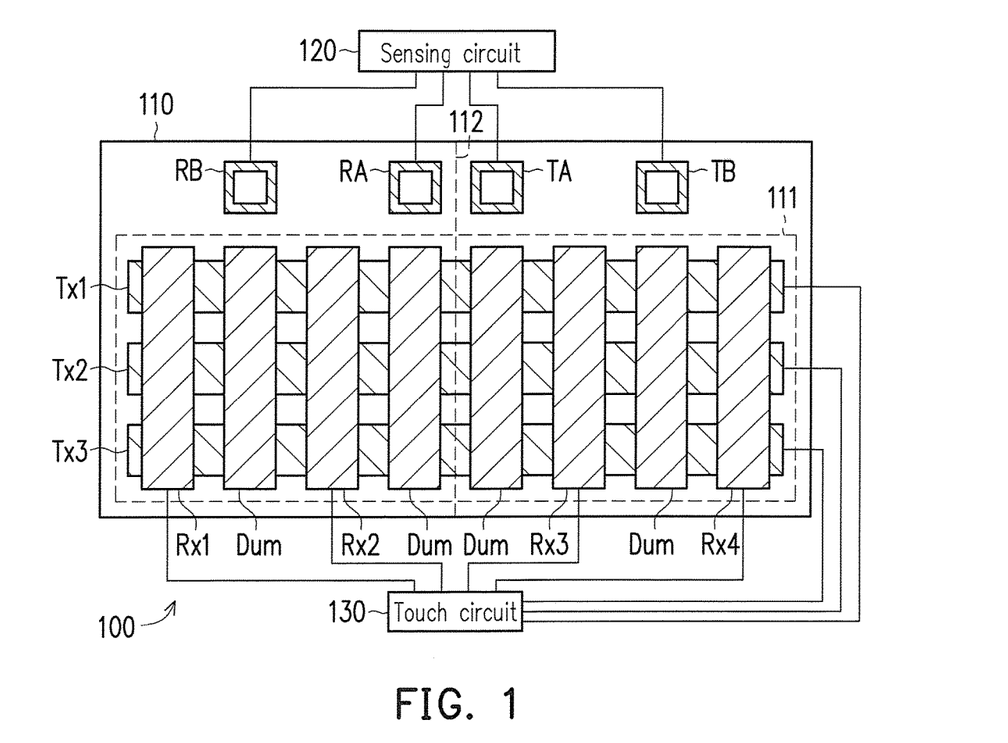
FIG. 1 is a schematic view illustrating a touch display apparatus according to an embodiment of the invention.

FIG. 1 is a schematic view illustrating a touch display apparatus 100 according to an embodiment of the invention. The touch display apparatus 100 includes a flexible touch display panel 110, a sensing circuit 120, and a touch circuit 130. The flexible touch display panel 110 has a touch electrode region 111. Touch transmission electrodes Tx1, Tx2, and Tx3 are arranged in the touch electrode region 111. Touch reception electrodes Rx1, Rx2, Rx3, and Rx4 are arranged in the touch electrode region 111. Touch transmission electrodes Tx1, Tx2, and Tx3 and the touch reception electrodes Rx1, Rx2, Rx3, and Rx4 are coupled to the touch circuit 130. The touch circuit 130 can drive the touch transmission electrodes Tx1, Tx2, and Tx3 and perform a touch detecting operation to the touch reception electrodes Rx1, Rx2, Rx3, and Rx40 for detecting touch events. The touch detecting operation may be done by performing a conventional detection technique or any other technique, and the invention is not limited thereto. For instance, the touch circuit 130 may be a conventional touch circuit and thus will not be further explained.

Based on manufacturing requirements, plural dummy electrodes Dum are arranged in the touch electrode region 111. The dummy electrodes Dum are arranged between any two of the touch reception electrodes Rx1-Rx4 of the flexible touch display panel 110, as shown in FIG. 1. The dummy electrodes Dum are not connected to the touch circuit 130. In general, the dummy electrodes Dum may be floating or grounded. Note that the shape and the number of the touch transmission electrodes Tx1-Tx3 and the touch reception electrodes Rx1-Rx4 shown in FIG. 1 are merely schematic and should not be construed as limitations to the invention.

Figure 2:
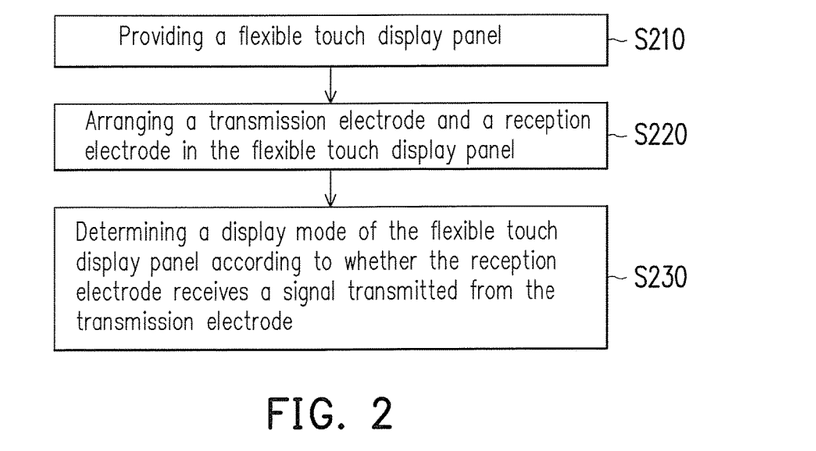
FIG. 2 is a schematic flowchart of an operation method of a touch display apparatus according to an embodiment of the invention.

FIG. 2 is a schematic flowchart of an operation method of a touch display apparatus according to an embodiment of the invention. In step S210, a flexible touch display panel configured to be bent along a first bending line is provided. For instance, as shown in FIG. 1, the flexible touch display panel 110 can be bent along the first bending line 112. In step S220, the transmission electrodes and the reception electrodes are arranged on the flexible touch display panel. For instance, as shown in FIG. 1, the transmission electrodes TA and TB and the reception electrodes RA and RB are arranged on the flexible touch display panel 110. The sensing circuit 120 shown in FIG. 1 can transmit signals through the transmission electrode TA and/or the transmission electrode TB, and the sensing circuit 120 can also sense whether the signal transmitted through the transmission electrode TA and/or the transmission electrode TB is received by the reception electrode RA and/or the reception electrode RB. In step S230, a display mode of the flexible touch display panel can be determined or switched according to whether the reception electrodes receive the signal transmitted from the transmission electrodes. The detailed description is provided hereinafter.

Figure 3:
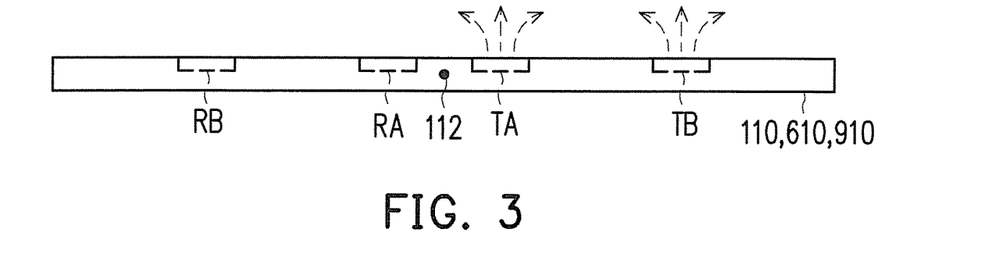
FIG. 3 is a schematic side view illustrating a flexible touch display panel that is not bent according to an embodiment of the invention.
Figure 4:
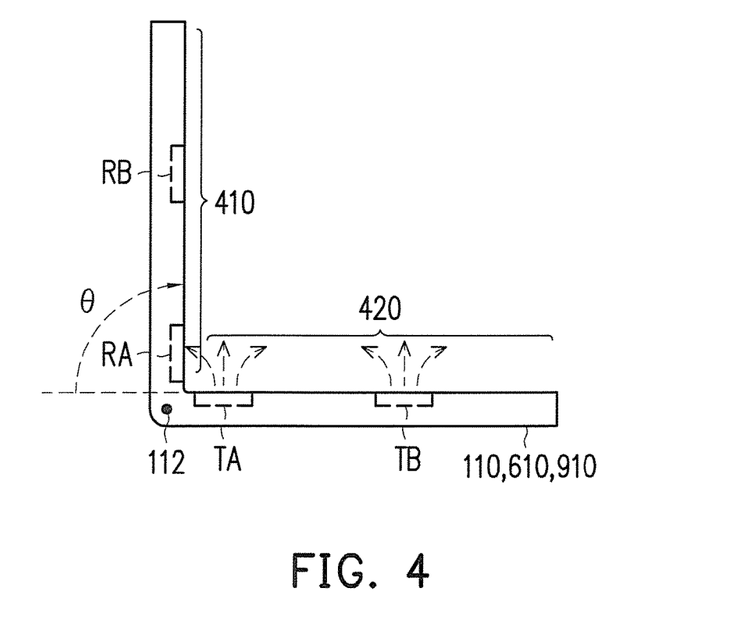
FIG. 4 is a schematic side view illustrating the flexible touch display panel that is shown in FIG. 3 and is bent at 90 degrees along a first bending line according to an embodiment of the invention.
Figure 5:
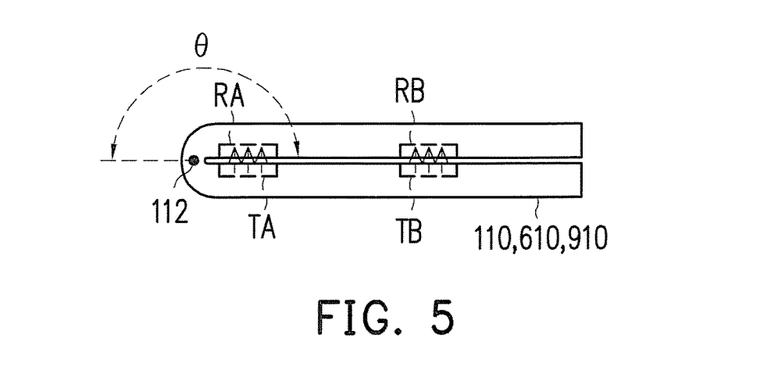
FIG. 5 is a schematic side view illustrating the flexible touch display panel that is shown in FIG. 3 and is folded in half along a first bending line according to an embodiment of the invention.

FIG. 3 is a schematic side view illustrating a flexible touch display panel (e.g., the flexible touch display panel 110 shown in FIG. 1, the flexible touch display panel 610 shown in FIG. 6 and FIG. 7, or the flexible touch display panel 910 shown in FIG. 9) that is not bent according to an embodiment of the invention. FIG. 4 is a schematic side view illustrating the flexible touch display panel that is shown in FIG. 3 and is bent at 90 degrees along the first bending line 112 according to an embodiment of the invention. FIG. 5 is a schematic side view illustrating the flexible touch display panel that is shown in FIG. 3 and is folded in half along the first bending line 112 according to an embodiment of the invention. With reference to FIG. 1 to FIG. 5, the transmission electrode TA and the reception electrode RB are arranged on the flexible touch display panel 110 and located outside the touch electrode region 111. The transmission electrode TA and the reception electrode RA are symmetrically located on two sides of the first bending line 112, respectively, such that the reception electrode RA can receive a signal transmitted from the transmission electrode TA when the flexible touch display panel 110 is bent along the first bending line 112. The transmission electrode TB and the reception electrode RB are arranged on the flexible touch display panel 110 and located outside the touch electrode region 111. The transmission electrode TB and the reception electrode RB are symmetrically located on two sides of the first bending line 112, respectively, such that the reception electrode RB can receive a signal transmitted from the transmission electrode TB when the flexible touch display panel 110 is bent along the first bending line 112.

In the present embodiment, the transmission electrodes TA and TB and the reception electrodes RA and RB are coils. The transmission electrodes TA and TB are able to send electromagnetic signals, and the reception electrodes RA and RB are able to sense the electromagnetic signals. The display mode of the flexible touch display panel 110 can be determined or switched according to whether the reception electrode RA receives the signal transmitted from the transmission electrode TA and/or according to whether the reception electrode RB receives the signal transmitted from the transmission electrode TB.

If the flexible touch display panel 110 is not bent (as shown in FIG. 3), the reception electrode RA does not receive the signal transmitted from the transmission electrode TA, nor does the reception electrode RB receive the signal transmitted from the transmission electrode TB. The display mode of the flexible touch display panel 110 is thus switched to a first display mode because the reception electrodes RA and RB both fail to receive the signals transmitted from the transmission electrodes TA and TB. For instance, the first display mode may be a tablet mode, which should however not be construed as a limitation to the invention. In the tablet mode, the flexible touch display panel 110 is able to perform the display function and the touch function of a conventional tablet PC.

If the flexible touch display panel 110 is bent along the first bending line 112 at a bending angle θ, and when the bending angle θ falls within a first range, the reception electrode RA receives the signal transmitted from the transmission electrode TA, and the reception electrode RB does not receive the signal transmitted from the transmission electrode TB. The first range can be determined according to the design requirements or determined according to the properties of the transmission electrodes and the reception electrodes. For instance, the first range may be defined as 60°-150°, which should however not be construed as a limitation to the invention. If the flexible touch display panel 110 is bent along the first bending line 112 at the bending angle θ that falls within 60°150°, e.g., the bending angle θ is 90°, the reception electrode RA receives the signal transmitted from the transmission electrode TA, and the reception electrode RB does not receive the signal transmitted from the transmission electrode TB, as shown in FIG. 4. The display mode of the flexible touch display panel 110 is switched to a second display mode because the reception electrode RA receives the signal transmitted from the transmission electrode TA but the reception electrode RB does not receive the signal transmitted from the transmission electrode TB. For instance, the second display mode may be a notebook mode, which should however not be construed as a limitation to the invention. In the notebook mode, a first sub-region 410 of the flexible touch display panel 110 is capable of performing the display function of a conventional notebook computer, and a second sub-region 420 of the flexible touch display panel 110 is able to display an image of a keyboard and perform functions of the conventional keyboard.

If the flexible touch display panel 110 is bent along the first bending line 112 at the bending angle θ that falls within a second range, the reception electrode RA receives the signal transmitted from the transmission electrode TA, and the reception electrode RB receives the signal transmitted from the transmission electrode TB. The second range can be determined according to the design requirements or determined according to the properties of the transmission electrodes and the reception electrodes. For instance, the second range may be defined as 150° 480°, which should however not be construed as a limitation to the invention. If the flexible touch display panel 110 is bent along the first bending line 112 at the bending angle θ that falls within 150°-180°, e.g., the bending angle θ is 180°, the reception electrode RA receives the signal transmitted from the transmission electrode TA, and the reception electrode RB receives the signal transmitted from the transmission electrode TB, as shown in FIG. 5. The display mode of the flexible touch display panel 110 is switched to a third display mode because the reception electrode RA receives the signal transmitted from the transmission electrode TA and the reception electrode RB receives the signal transmitted from the transmission electrode TB. For instance, the third display mode may be a hibernation mode, which should however not be construed as a limitation to the invention. In the hibernation mode, the display function and the touch function of the flexible touch display panel 110 may be switched off (or disabled).

Figure 6:
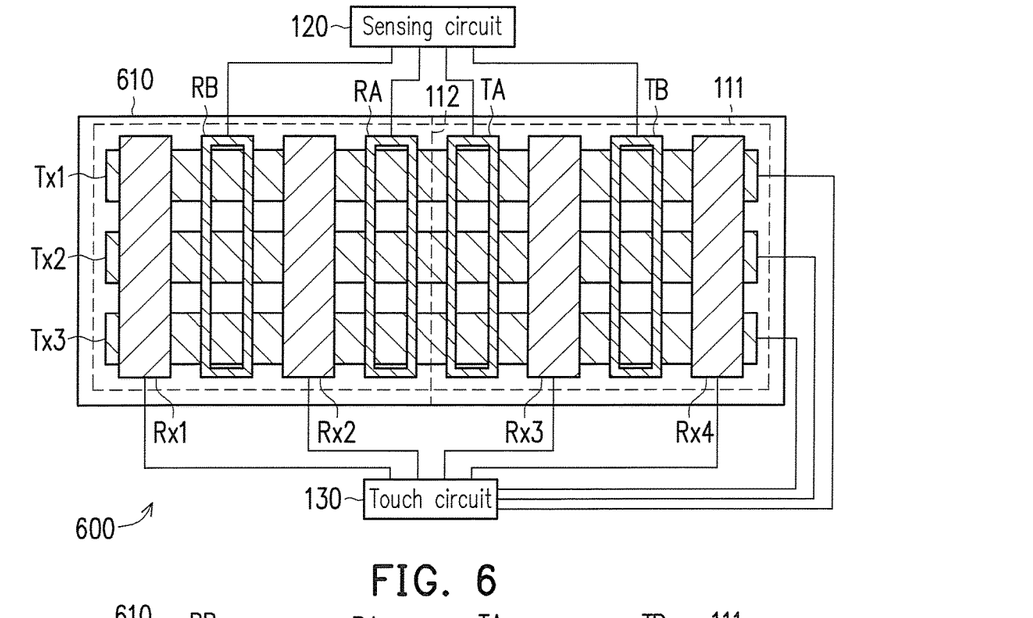
FIG. 6 is a schematic view illustrating a touch display apparatus according to another embodiment of the invention.

FIG. 6 is a schematic view illustrating a touch display apparatus 600 according to another embodiment of the invention. The touch display apparatus 600 includes a flexible touch display panel 610, a sensing circuit 120, and a touch circuit 130. Touch transmission electrodes Tx1-Tx3 and touch reception electrodes Rx1-Rx4 are arranged in a touch electrode region of the flexible touch display panel 610. Plural dummy electrodes are arranged in the touch electrode region of the flexible touch display panel 610 and between any two of the touch reception electrodes Rx1-Rx4 of the flexible touch display panel 610. The transmission electrodes TA and TB and the reception electrodes RA and RB are arranged in the touch electrode region of the flexible touch display panel 610 and located in different dummy electrode regions, as shown in FIG. 6. The descriptions of the sensing circuit 120, the touch circuit 130, the touch transmission electrodes Tx1-Tx3, the touch reception electrodes Rx1-Rx4, the transmission electrodes TA and TB, and the reception electrodes RA and RB can be derived from the explanations provided above with reference to FIG. 1 to FIG. 5 and therefore will be omitted hereinafter.

According to the embodiment shown in FIG. 6, the transmission electrodes TA and TB and the reception electrodes RA and RB replace the dummy electrodes Dum shown in FIG. 1, so as to reduce the layout area. The flexible touch display panel 610 is configured to be bent along the first bending line 112. The descriptions provided in the previous embodiments and shown in FIG. 2 to FIG. 5 are applicable to the descriptions provided in the present embodiment and shown in FIG. 6 and thus will not be further provided hereinafter. The operating frequency of the transmission electrodes TA and TB is different from the operating frequency of the touch transmission electrodes Tx1-Tx3, and thus the sensing operation of the reception electrodes RA and RB does not interfere with the sensing operation of the touch reception electrodes Rx1-Rx4. Note that the shape and the number of the touch transmission electrodes Tx1-Tx3 and the touch reception electrodes Rx1-Rx4 of the flexible touch display panel 610 as shown in FIG. 6 are merely schematic and should not be construed as limitations to the invention.

Figure 7:
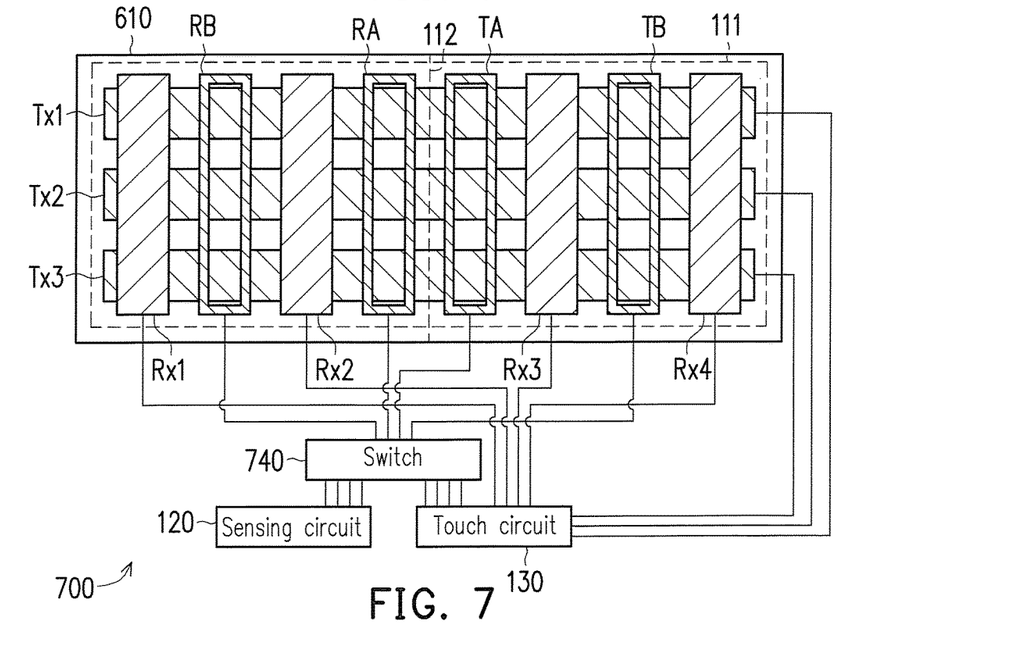
FIG. 7 is a schematic view illustrating a touch display apparatus according to still another embodiment of the invention.

FIG. 7 is a schematic view illustrating a touch display apparatus 700 according to still another embodiment of the invention. The touch display apparatus 700 includes a flexible touch display panel 610, a sensing circuit 120, a touch circuit 130, and a switch 740. The descriptions of the flexible touch display panel 610, the sensing circuit 120, the touch circuit 130, the touch transmission electrodes Tx1-Tx3, the touch reception electrodes Rx1-Rx4, the transmission electrodes TA and TB, and the reception electrodes RA and RB can be derived from the explanations provided above with reference to FIG. 6 and therefore will be omitted hereinafter.

The switch 740 is coupled to the transmission electrodes TA and TB and the reception electrodes RA and RB. The touch circuit 130 is coupled to the switch 740, the touch transmission electrodes Tx1-Tx3 and the touch reception electrodes Rx1-Rx4. The sensing circuit 120 is coupled to the switch 740. In the present embodiment, the sensing circuit 120 and the touch circuit 130 share the transmission electrodes TA and TB and the reception electrodes RA and RB at different time points. During the touch driving period, the switch 740 selectively electrically connects the transmission electrodes TA and TB and the reception electrodes RA and RB to the touch circuit 130, such that the touch circuit 130 detects a touch event of the flexible touch display panel 610 through the transmission electrodes TA and TB, the reception electrodes RA and RB, and the touch reception electrodes Rx1-Rx4. The detection of touch events by the touch circuit 130 may be done through performing a conventional detection technique or any other technique, and the invention is not limited thereto. During a sensing period, the switch 740 selectively electrically connects the transmission electrodes TA and TB and the reception electrodes RA and RB to the sensing circuit 120, such that the sensing circuit 120 transmits a signal through the transmission electrodes TA and TB and senses whether the reception electrodes RA and RB receive the signal transmitted through the transmission electrodes TA and TB.

Figure 8:
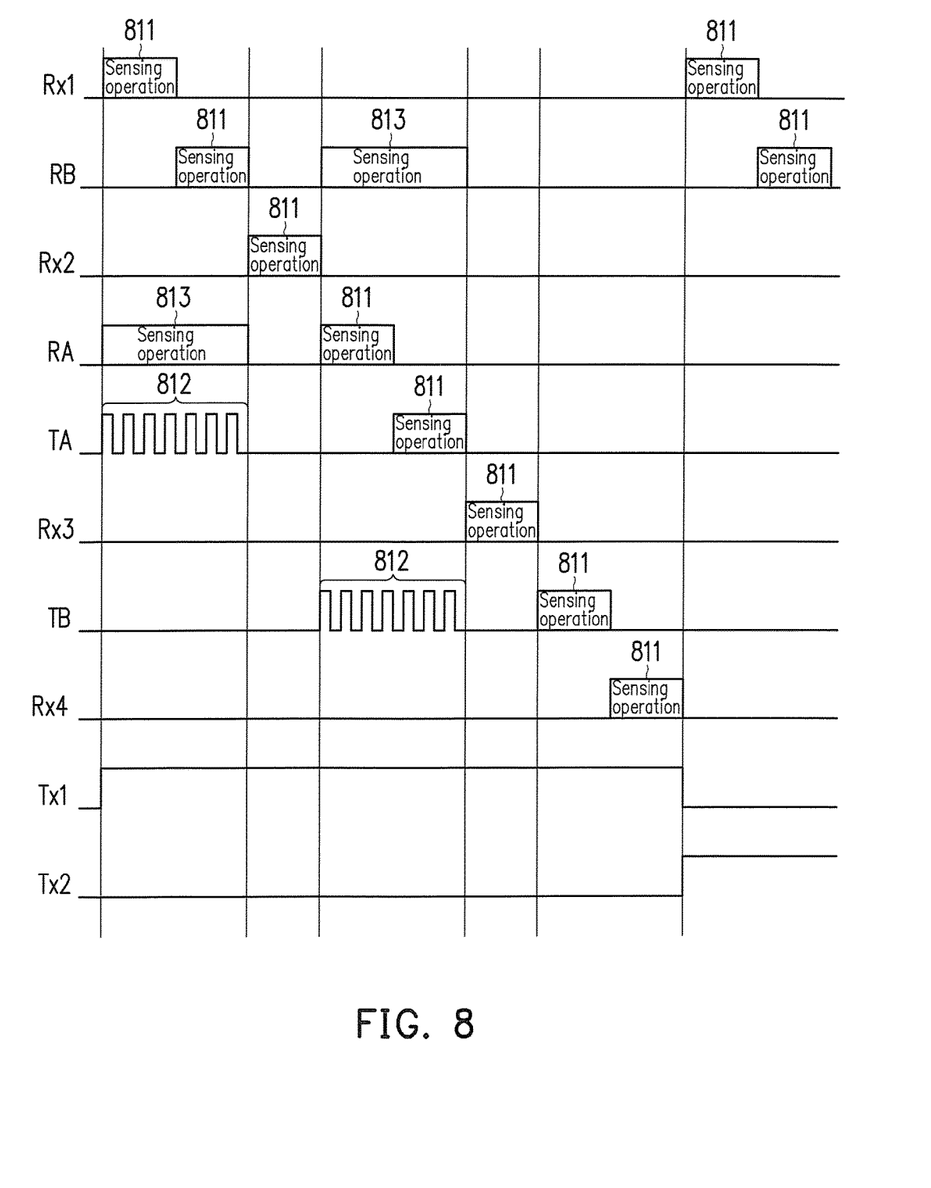
FIG. 8 is a schematic sequence diagram of operating a touch display apparatus according to an embodiment of the invention.

FIG. 8 is a schematic sequence diagram of operating a touch display apparatus according to an embodiment of the invention. With reference to FIG. 7 and FIG. 8, according to the switching operation of the switch 740, the sensing circuit 120 and the touch circuit 130 share the transmission electrodes TA and TB and the reception electrodes RA and RB at different time points. When the switch 740 selectively electrically connects the transmission electrodes TA and TB and the reception electrodes RA and RB to the touch circuit 130, the transmission electrodes TA and TB and the reception electrodes RA and RB may serve as the touch reception electrodes during the touch detection operation of the touch circuit 130. Hence, the touch circuit 130 is able to scan the transmission electrodes TA and TB, the reception electrodes RA and RB, and the touch reception electrodes Rx1-Rx4 (i.e., the sensing operation shown in FIG. 8) for detecting a touch event of the flexible touch display panel 610. During a non-scan period of the transmission electrodes TA and TB and the reception electrodes RA and RB, i.e., during a period of performing no sensing operation 811, the switch 740 electrically connects the transmission electrodes TA and TB and the reception electrodes RA and RB to the sensing circuit 120. Hence, the sensing circuit 120 is able to transmit a signal (i.e., an alternating current (AC) signal or the pulse 812 with high-frequency as shown in FIG. 8) through the transmission electrodes TA and TB and perform the sensing function (i.e., the sensing operation 813 shown in FIG. 8) through the reception electrodes RA and RB. According to whether the reception electrodes RA and RB receive the pulse 812 (with high-frequency) transmitted through the transmission electrodes TA and TB, the sensing circuit 120 may correspondingly change the display mode of the flexible touch display panel 610, which can be deduced from the descriptions provided in FIG. 2 to FIG. 5.

Figure 9:
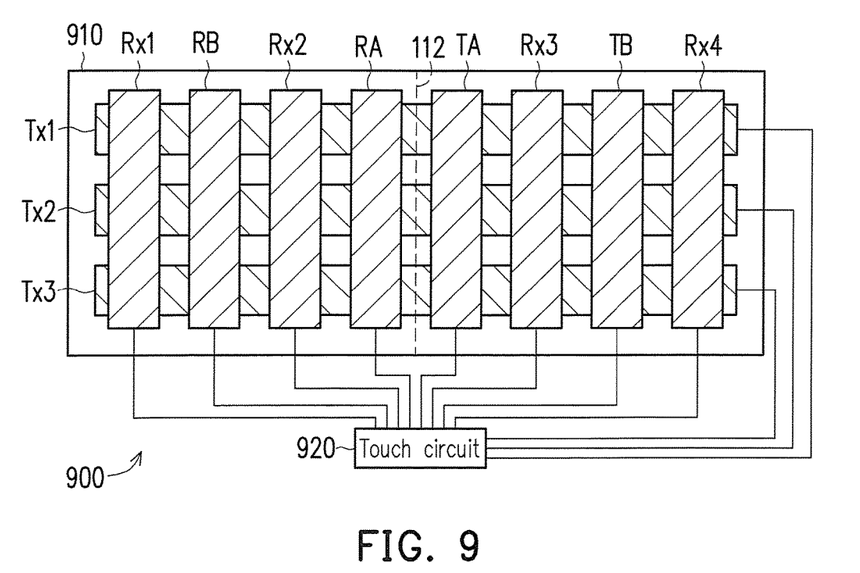
FIG. 9 is a schematic view illustrating a touch display apparatus according to still another embodiment of the invention.

FIG. 9 is a schematic view illustrating a touch display apparatus 900 according to still another embodiment of the invention. The touch display apparatus 900 includes a flexible touch display panel 910 and a touch circuit 920. The touch circuit 920 shown in FIG. 9 can be considered an integrated circuit including the sensing circuit 120, the touch circuit 130, and the switch 740 shown in FIG. 7; namely, the touch circuit 920 can perforin functions similar to those performed by the sensing circuit 120, the touch circuit 130, and the switch 740 shown in FIG. 7. The operation of the touch circuit 920 can be deduced from the description provided in FIG. 8 and thus will not be further explained hereinafter. Through the switching operation, the transmission electrodes TA and TB and the reception electrodes RA and RB may act as the touch reception electrodes during the touch driving period, so as to detect a touch event of the flexible touch display panel 910. Similarly, through the switching operation, the touch circuit 920 can transmit signals through the transmission electrodes TA and TB, and the touch circuit 920 can also sense whether the signals transmitted through the transmission electrodes TA and TB are received by the reception electrodes RA and RB. The descriptions of the flexible touch display panel 910, the touch transmission electrodes Tx1-Tx3, the touch reception electrodes Rx1-Rx4, the transmission electrodes TA and TB, and the reception electrodes RA and RB depicted in FIG. 9 can be derived from the explanations provided above with reference to FIG. 6 to FIG. 8 and therefore will be omitted hereinafter. In the present embodiment shown in FIG. 9, the transmission electrodes TA and TB and the reception electrodes RA and RB are not coils. The layout configuration (shape) of the transmission electrodes TA and TB and the reception electrodes RA and RB may be the same as that of the touch reception electrodes Rx1-Rx4.

Figure 10:
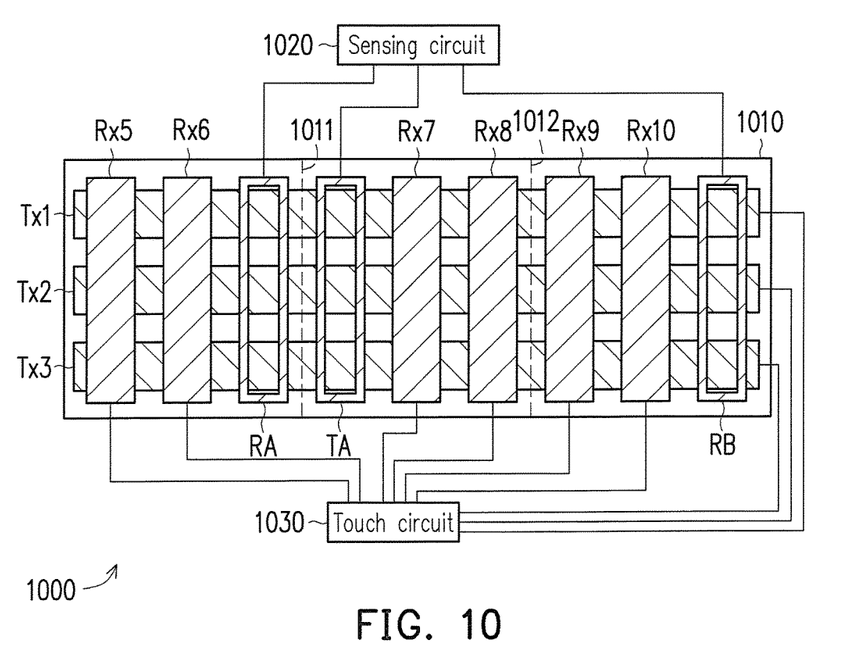
FIG. 10 is a schematic view illustrating a touch display apparatus according to still another embodiment of the invention.

FIG. 10 is a schematic view illustrating a touch display apparatus 1000 according to still another embodiment of the invention. The touch display apparatus 1000 includes a flexible touch display panel 1010, a sensing circuit 1020, and a touch circuit 1030. The touch transmission electrodes Tx1-Tx3 and the touch reception electrodes Rx5, Rx6, Rx7, Rx8, Rx9, and Rx10 are arranged in a touch electrode region of the flexible touch display panel 1010. Plural dummy electrode regions are arranged in the touch electrode region of the flexible touch display panel 1010, and the transmission electrode TA and the reception electrodes RA and RB are located in different dummy electrode regions of the flexible touch display panel 1010, as shown in FIG. 10. The descriptions of the sensing circuit 1020, the touch circuit 1030, the touch transmission electrodes Tx1-Tx3, the touch reception electrodes Rx5-Rx10, the transmission electrode TA, and the reception electrodes RA and RB as shown in FIG. 10 can be derived from the explanations of the sensing circuit 120, the touch circuit 130, the touch transmission electrodes Tx1-Tx3, the touch reception electrodes Rx1-Rx14, the transmission electrodes TA and TB, and the reception electrodes RA and RB provided above with reference to FIG. 1 to FIG. 6 and therefore will be omitted hereinafter.

As shown in FIG. 10, the flexible touch display panel 1010 can be bent along a first bending line 1011 and a second bending line 1012. The sensing circuit 1020 can transmit a signal through the transmission electrode TA, and the sensing circuit 1020 can sense whether the signal transmitted through the transmission electrode TA is received by the reception electrode RA and/or the reception electrode RB. The transmission electrode TA and the reception electrode RA are symmetrically located on two sides of the first bending line 1011, respectively, such that the reception electrode RA can receive the signal transmitted from the transmission electrode TA when the flexible touch display panel 1010 is bent along the first bending line 1011. The transmission electrode TA and the reception electrode RB are symmetrically located on two sides of the second bending line 1012, respectively, such that the reception electrode RB can receive the signal transmitted from the transmission electrode TA when the flexible touch display panel 1010 is bent along the second bending line 1012. The display mode of the flexible touch display panel 1010 can be determined or changed according to whether the reception electrode RA receives the signal transmitted from the transmission electrode TA and/or according to whether the reception electrode RB receives the signal transmitted from the transmission electrode TA, as shown in FIG. 11-FIG. 15.

Figure 11:
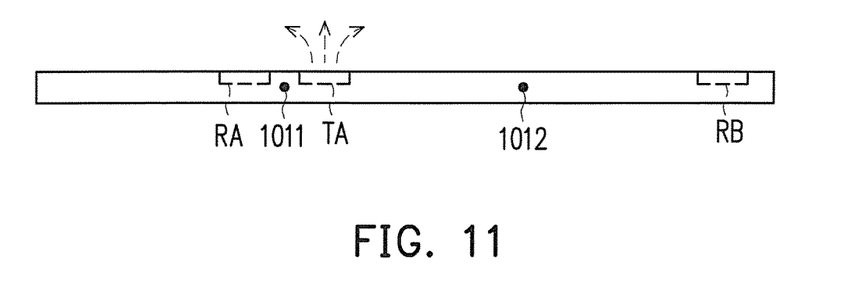
FIG. 11 is a schematic side view illustrating the flexible touch display panel that is shown in FIG. 10 and is not bent according to an application scenario.

FIG. 11 is a schematic side view illustrating the flexible touch display panel 1010 that is shown in FIG. 10 and is not bent according to an application scenario. In the application scenario shown in FIG. 11, the flexible touch display panel 1010 is kept flat and is not bent, and thus neither the reception electrode RA nor the reception electrode RB receives the signal transmitted from the transmission electrode TA. When neither the reception electrode RA nor the reception electrode RB receives the signal transmitted from the transmission electrode TA, the display mode of the flexible touch display panel 1010 is switched to a first display mode. For instance, according to the detection result of the reception electrodes RA and RB and the configuration of functional keys (not shown, may be physical keys or virtual keys on display screens), the first display mode may be a tablet mode, which should however not be construed as a limitation to the invention. In the tablet mode, the flexible touch display panel 1010 is able to perform the display function and the touch function of a conventional tablet PC.

Figure 12:
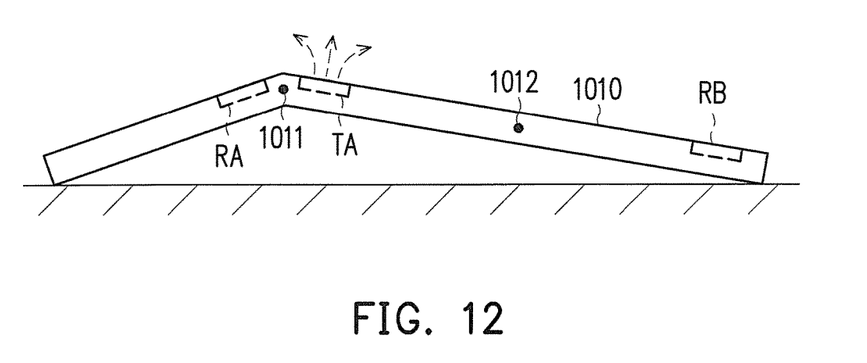
FIG. 12 is a schematic side view illustrating the flexible touch display panel that is shown in FIG. 10 and is bent along a first bending line according to another application scenario.

FIG. 12 is a schematic side view illustrating the flexible touch display panel 1010 that is shown in FIG. 10 and is bent along the first bending line 1011 according to another application scenario. According to the application scenario shown in FIG. 12, neither the reception electrode RA nor the reception electrode RB receives the signal transmitted from the transmission electrode TA; hence, the display mode of the flexible touch display panel 1010 is switched to a second display mode. For instance, according to the detection result of the reception electrodes RA and RB and the configuration of functional keys (not shown, may be physical keys or virtual keys on display screens), the flexible touch display panel 1010 in the second display mode is capable of performing both the functions of a mobile phone and the functions of a tablet PC, which should however not be construed as a limitation to the invention.

Figure 13:
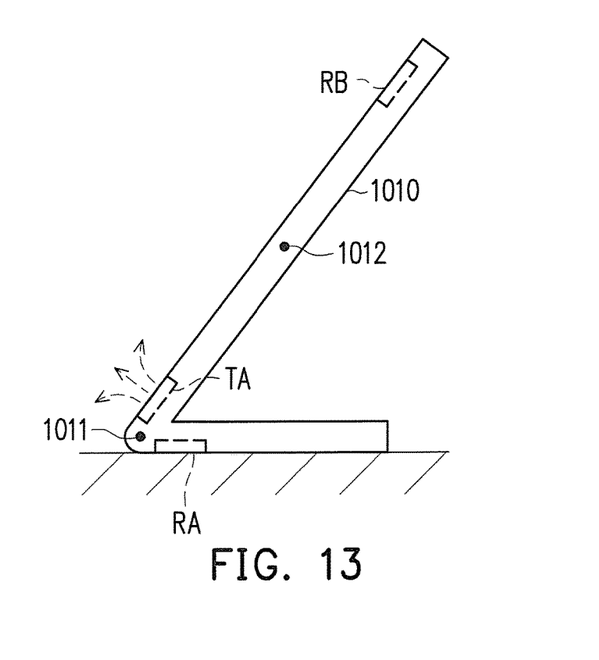
FIG. 13 is a schematic side view illustrating the flexible touch display panel that is shown in FIG. 10 and is folded in half along the first bending line according to still another application scenario.

FIG. 13 is a schematic side view illustrating the flexible touch display panel 1010 that is shown in FIG. 10 and is bent along the first bending line 1011 according to another application scenario. In the application scenario shown in FIG. 13, a portion of the flexible touch display panel 1010 can serve as a support. Since neither the reception electrode RA nor the reception electrode RB receives the signal transmitted from the transmission electrode TA, the display mode of the flexible touch display panel 1010 is switched to a third display mode. For instance, according to the detection result of the reception electrodes RA and RB and the configuration of functional keys (not shown, may be physical keys or virtual keys on display screens), the flexible touch display panel 1010 in the third display mode is capable of performing both the functions of a mobile phone and the functions of a tablet PC, which should however not be construed as a limitation to the invention.

Figure 14:
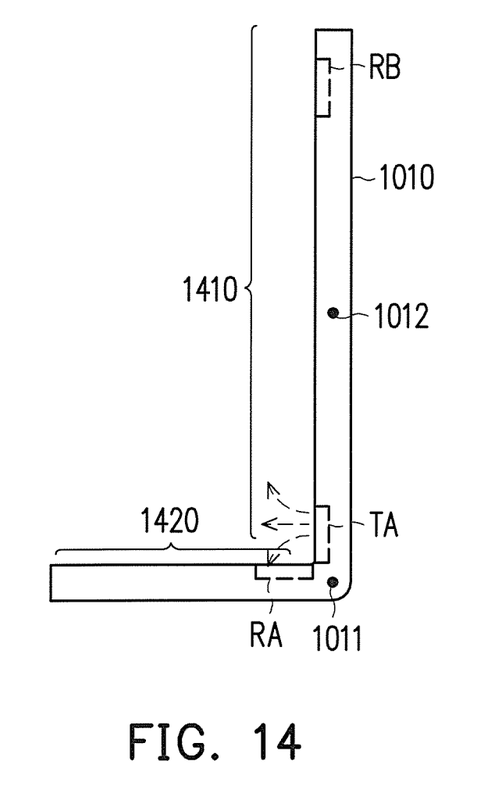
FIG. 14 is a schematic side view illustrating the flexible touch display panel that is shown in FIG. 10 and is bent along a first bending line according to still another application scenario.

FIG. 14 is a schematic side view illustrating the flexible touch display panel 1010 that is shown in FIG. 10 and is bent along the first bending line 1011 according to another application scenario. In the application scenario shown in FIG. 14, the reception electrode RA receives the signal transmitted from the transmission electrode TA, and the reception electrode RB does not receive the signal transmitted from the transmission electrode TA. Accordingly, the sensing circuit 1020 correspondingly switches the display mode of the flexible touch display panel 1010 to a fourth display mode. For instance, the fourth display mode may be a notebook mode, which should however not be construed as a limitation to the invention. In the notebook mode, a first sub-region 1410 of the flexible touch display panel 1010 is capable of performing the display function of a conventional notebook computer, and a second sub-region 1420 of the flexible touch display panel 1010 is able to display an image of a keyboard and perform functions of the conventional keyboard.

Figure 15:
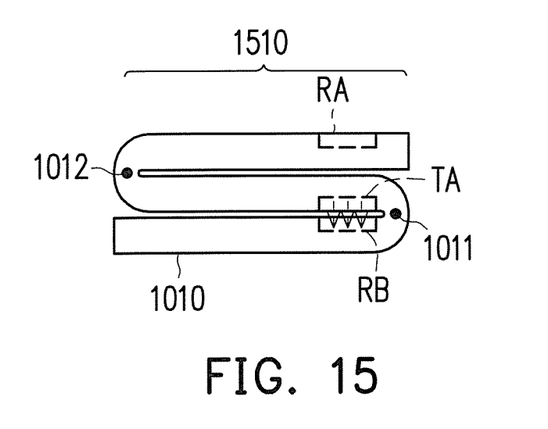
FIG. 15 is a schematic side view illustrating the flexible touch display panel that is shown in FIG. 10 according to an application scenario.

FIG. 15 is a schematic side view illustrating the flexible touch display panel 1010 that is shown in FIG. 10 according to an application scenario. In the application scenario shown in FIG. 15, the flexible touch display panel 1010 is bent along the first bending line 1011 and the second bending line 1012. At this time, the reception electrode RB receives the signal transmitted from the transmission electrode TA, and the reception electrode RA does not receive the signal transmitted from the transmission electrode TA. Accordingly, the sensing circuit 1020 correspondingly switches the display mode of the flexible touch display panel 1010 to a fifth display mode. For instance, the fourth display mode may be a handheld phone mode, which should however not be construed as a limitation to the invention. In the handheld phone mode, one sub-region 1510 of the flexible touch display panel 1010 is capable of performing the function of a conventional handheld phone, and the display function and the touch function performed by other sub-regions of the flexible touch display panel 1010 may be switched off (or disabled).

To sum up, it is likely to sense whether the flexible touch display panel of the touch display apparatus is bent through applying the operation method according to the embodiments of the invention. The first transmission electrode and the first reception electrode are symmetrically located on the two sides of the bending line, respectively. When the flexible touch display panel is bent along the bending line, the first reception electrode can receive the signal transmitted from the first transmission electrode. Hence, the first transmission electrode and the first reception electrode can be configured to sense whether the flexible touch display panel is being bent. Besides, the display mode of the flexible touch display panel is changed according to whether the first reception electrode receives the signal transmitted from the first transmission electrode, e.g., the touch function and/or the display function of the flexible touch display panel may be switched off, or the display mode is switched to the hibernation mode. In some embodiments of the invention, the first transmission electrode, the first reception electrode, the second transmission electrode, and the second reception electrode can sense the range of the bending angle of the flexible touch display panel. In response to the bending angle of the flexible touch display panel, the display mode of the flexible touch display panel is correspondingly switched.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A touch display apparatus comprising:
a flexible touch display panel configured to be bent along a first bending line;
a first transmission electrode arranged on the flexible touch display panel;
a first reception electrode arranged on the flexible touch display panel, wherein the first transmission electrode and the first reception electrode are symmetrically located on two sides of the first bending line, respectively, such that the first reception electrode receives a signal transmitted from the first transmission electrode when the flexible touch display panel is bent along the first bending line, and a display mode of the flexible touch display panel is determined according to whether the first reception electrode receives the signal transmitted from the first transmission electrode;
a second transmission electrode arranged on the flexible touch display panel; and
a second reception electrode arranged on the flexible touch display panel, wherein the second transmission electrode and the second reception electrode are symmetrically located on the two sides of the first bending line, respectively, such that the second reception electrode receives a signal transmitted from the second transmission electrode when the flexible touch display panel is bent along the first bending line, wherein when the flexible touch display panel is bent along the first bending line at a bending angle, and when the bending angle falls within a first range, the first reception electrode receives the signal transmitted from the first transmission electrode, and the second reception electrode does not receive the signal transmitted from the second transmission electrode, wherein when the bending angle falls within a second range, the first reception electrode receives the signal transmitted from the first transmission electrode, and the second reception electrode receives the signal transmitted from the second transmission electrode.

2. The touch display apparatus as recited in claim 1, wherein the first transmission electrode and the first reception electrode are coils, respectively.

3. The touch display apparatus as recited in claim 1, wherein the first transmission electrode and the first reception electrode are respectively located outside a touch electrode region of the flexible touch display panel.

4. The touch display apparatus as recited in claim 1, wherein the first transmission electrode and the first reception electrode are respectively located within a touch electrode region of the flexible touch display panel and are respectively located in different dummy electrode regions of the flexible touch display panel, and each of the dummy electrode regions is arranged between any two of touch reception electrodes of the flexible touch display panel.

5. The touch display apparatus as recited in claim 4, further comprising:
a switch coupled to the first transmission electrode and the first reception electrode;
a touch circuit coupled to the switch and the touch reception electrodes; and
a sensing circuit coupled to the switch,
wherein the switch selectively electrically connects the first transmission electrode and the first reception electrode to the touch circuit during a touch driving period, such that the touch circuit detects a touch event of the flexible touch display panel through the first transmission electrode, the first reception electrode, and the touch reception electrodes,
wherein the switch selectively electrically connects the first transmission electrode and the first reception electrode to the sensing circuit during a sensing period, such that the sensing circuit transmits a signal through the first transmission electrode and senses whether the first reception electrode receives the signal transmitted through the first transmission electrode.

6. The touch display apparatus as recited in claim 1, wherein the first transmission electrode and the first reception electrode act as two touch reception electrodes of the flexible touch display panel during a touch driving period, such that a touch circuit is able to detect a touch event of the flexible touch display panel through the first transmission electrode and the first reception electrode, and the touch circuit transmits a signal through the first transmission electrode during a sensing period and senses whether the first reception electrode receives the signal transmitted through the first transmission electrode during the sensing period.

7. The touch display apparatus as recited in claim 1, wherein the display mode of the flexible touch display panel is switched to a tablet mode if the first reception electrode does not receive the signal transmitted from the first transmission electrode, and the second reception electrode does not receive the signal transmitted from the second transmission electrode.

8. The touch display apparatus as recited in claim 1, wherein the display mode of the flexible touch display panel is switched to a notebook mode if the first reception electrode receives the signal transmitted from the first transmission electrode, and the second reception electrode does not receive the signal transmitted from the second transmission electrode.

9. The touch display apparatus as recited in claim 1, wherein the display mode of the flexible touch display panel is switched to a hibernation mode if the first reception electrode receives the signal transmitted from the first transmission electrode, and the second reception electrode receives the signal transmitted from the second transmission electrode.

10. The touch display apparatus as recited in claim 1, wherein the flexible touch display panel is configured to be bent along a second bending line, and the touch display apparatus further comprises:
a second reception electrode arranged on the flexible touch display panel, wherein the first transmission electrode and the second reception electrode are symmetrically located on two sides of the second bending line, respectively, such that the second reception electrode receives a signal transmitted from the first transmission electrode when the flexible touch display panel is bent along the second bending line, and the display mode of the flexible touch display panel is determined according to whether the second reception electrode receives the signal transmitted from the first transmission electrode.

11. The touch display apparatus as recited in claim 10, wherein the display mode of the flexible touch display panel is switched to a tablet mode if neither the first reception electrode nor the second reception electrode receives the signal transmitted from the first transmission electrode.

12. The touch display apparatus as recited in claim 10, wherein the display mode of the flexible touch display panel is switched to a notebook mode if the first reception electrode receives the signal transmitted from the first transmission electrode, and the second reception electrode does not receive the signal transmitted from the first transmission electrode.

13. The touch display apparatus as recited in claim 10, wherein the display mode of the flexible touch display panel is switched to a handheld phone mode if the first reception electrode does not receive the signal transmitted from the first transmission electrode, and the second reception electrode receives the signal transmitted from the first transmission electrode.

14. An operation method of a touch display apparatus, comprising:
providing a flexible touch display panel configured to be bent along a first bending line;
arranging a first transmission electrode on the flexible touch display panel; and
arranging a first reception electrode on the flexible touch display panel, wherein the first transmission electrode and the first reception electrode are symmetrically located on the two sides of the first bending line, respectively, such that the first reception electrode receives a signal transmitted from the first transmission electrode when the flexible touch display panel is bent along the first bending line;

determining a display mode of the flexible touch display panel according to whether the first reception electrode receives the signal transmitted from the first transmission electrode;

arranging a second transmission electrode on the flexible touch display panel; and arranging a second reception electrode on the flexible touch display panel, wherein the second transmission electrode and the second reception electrode are symmetrically located on the two sides of the first bending line, respectively, such that the second reception electrode receives a signal transmitted from the second transmission electrode when the flexible touch display panel is bent along the first bending line, wherein when the flexible touch display panel is bent along the first bending line at a bending angle, and when the bending angle falls within a first range, the first reception electrode receives the signal transmitted from the first transmission electrode, and the second reception electrode does not receive the signal transmitted from the second transmission electrode, wherein when the bending angle falls within a second range, the first reception electrode receives the signal transmitted from the first transmission electrode, and the second reception electrode receives the signal transmitted from the second transmission electrode.

15. The operation method as recited in claim 14, wherein the first transmission electrode and the first reception electrode are coils, respectively.

16. The operation method as recited in claim 14, wherein the first transmission electrode and the first reception electrode are respectively located outside a touch electrode region of the flexible touch display panel.

17. The operation method as recited in claim 14, wherein the first transmission electrode and the first reception electrode are respectively located within a touch electrode region of the flexible touch display panel and are respectively located in different dummy electrode regions of the flexible touch display panel, and each of the dummy electrode region is arranged between any two of touch reception electrodes of the flexible touch display panel.

18. The operation method as recited in claim 17, further comprising:

selectively electrically connecting the first transmission electrode and the first reception electrode to a touch circuit by a switch during a touch driving period, such that the touch circuit detects a touch event of the flexible touch display panel through the first transmission electrode, the first reception electrode, and the touch reception electrodes; and selectively electrically connecting the first transmission electrode and the first reception electrode to a sensing circuit by the switch during a sensing period, such that the sensing circuit transmits a signal through the first transmission electrode and senses whether the first reception electrode receives the signal transmitted through the first transmission electrode.

19. The operation method as recited in claim 14, further comprising:

configuring the first transmission electrode and the first reception electrode as two touch reception electrodes of the flexible touch display panel during a touch driving period, such that a touch circuit detects a touch event of the flexible touch display panel through the first transmission electrode and the first reception electrode; and transmitting a signal by the touch circuit through the first transmission electrode during a sensing period and sensing whether the first reception electrode receives the signal transmitted through the first transmission electrode during the sensing period.

20. The operation method as recited in claim 14, wherein the display mode of the flexible touch display panel is switched to a tablet mode if the first reception electrode does not receive the signal transmitted from the first transmission electrode, and the second reception electrode does not receive the signal transmitted from the second transmission electrode.

21. The operation method as recited in claim 14, wherein the display mode of the flexible touch display panel is switched to a notebook mode if the first reception electrode receives the signal transmitted from the first transmission electrode, and the second reception electrode does not receive the signal transmitted from the second transmission electrode.

22. The operation method as recited in claim 14, wherein the display mode of the flexible touch display panel is switched to a hibernation mode if the first reception electrode receives the signal transmitted from the first transmission electrode, and the second reception electrode receives the signal transmitted from the second transmission electrode.

23. The operation method as recited in claim 14, wherein the flexible touch display panel is configured to be bent along a second bending line, and the operation method further comprises:

arranging a second reception electrode on the flexible touch display panel, wherein the first transmission electrode and the second reception electrode are symmetrically located on two sides of the second bending line, respectively, such that the second reception electrode receives a signal transmitted from the first transmission electrode when the flexible touch display panel is bent along the second bending line; and determining the display mode of the flexible touch display panel according to whether the second reception electrode receives the signal transmitted from the first transmission electrode.

24. The operation method as recited in claim 23, wherein the display mode of the flexible touch display panel is switched to a tablet mode if neither the first reception electrode nor the second reception electrode receives the signal transmitted from the first transmission electrode.

25. The operation method as recited in claim 23, wherein the display mode of the flexible touch display panel is switched to a notebook mode if the first reception electrode receives the signal transmitted from the first transmission electrode, and the second reception electrode does not receive the signal transmitted from the first transmission electrode.

26. The operation method as recited in claim 23, wherein the display mode of the flexible touch display panel is switched to a handheld phone mode if the first reception electrode does not receive the signal transmitted from the first transmission electrode, and the second reception electrode receives the signal transmitted from the first transmission electrode.

* * * * *